United States Patent [19]
Kopera

[11] 3,712,318
[45] Jan. 23, 1973

[54] VORTEX PROXIMITY SENSOR WITH INCREASED SENSING RANGE

[75] Inventor: Anthony Kopera, Beltsville, Md.

[73] Assignee: Bowles Fluidics Corporation, Silver Spring, Md.

[22] Filed: Oct. 21, 1970

[21] Appl. No.: 82,640

Related U.S. Application Data

[63] Continuation-in-part of Ser. No. 835,643, June 23, 1969, abandoned.

[52] U.S. Cl. ............... 137/13, 137/14, 137/81.5, 73/37.5
[51] Int. Cl. .................................. F15c 1/16
[58] Field of Search .......... 137/81.5, 13, 14; 73/37.5, 73/515, 501, 521

[56] References Cited

UNITED STATES PATENTS

| | | | |
|---|---|---|---|
| 3,481,180 | 12/1969 | Jones | 73/37.5 |
| 3,545,256 | 12/1970 | Beeken | 73/37.5 |
| 3,482,433 | 12/1969 | Gladwyn | 73/37.5 |
| 3,543,779 | 12/1970 | Eckerlin et al. | 137/81.5 |
| 3,597,961 | 8/1971 | Pinkstaff | 73/37.5 |

*Primary Examiner*—William R. Cline
*Attorney*—Rose & Edell

[57] ABSTRACT

Proximity sensing is achieved by issuing a vortical sheet of fluid from an axial outlet passage of a vortex chamber and sensing the static pressure in a sensor tube disposed along the chamber axis. Pressure in the sensor tube is a function of object proximity to the outlet passage. Premature collapse of the vortical sheet is prevented by raising the pressure interiorly of the vortex sheet from a negative pressure. This is achieved by supplying a portion of the vortex chamber fluid to the sensor tube and hence to the interior of the vortex sheet.

20 Claims, 11 Drawing Figures

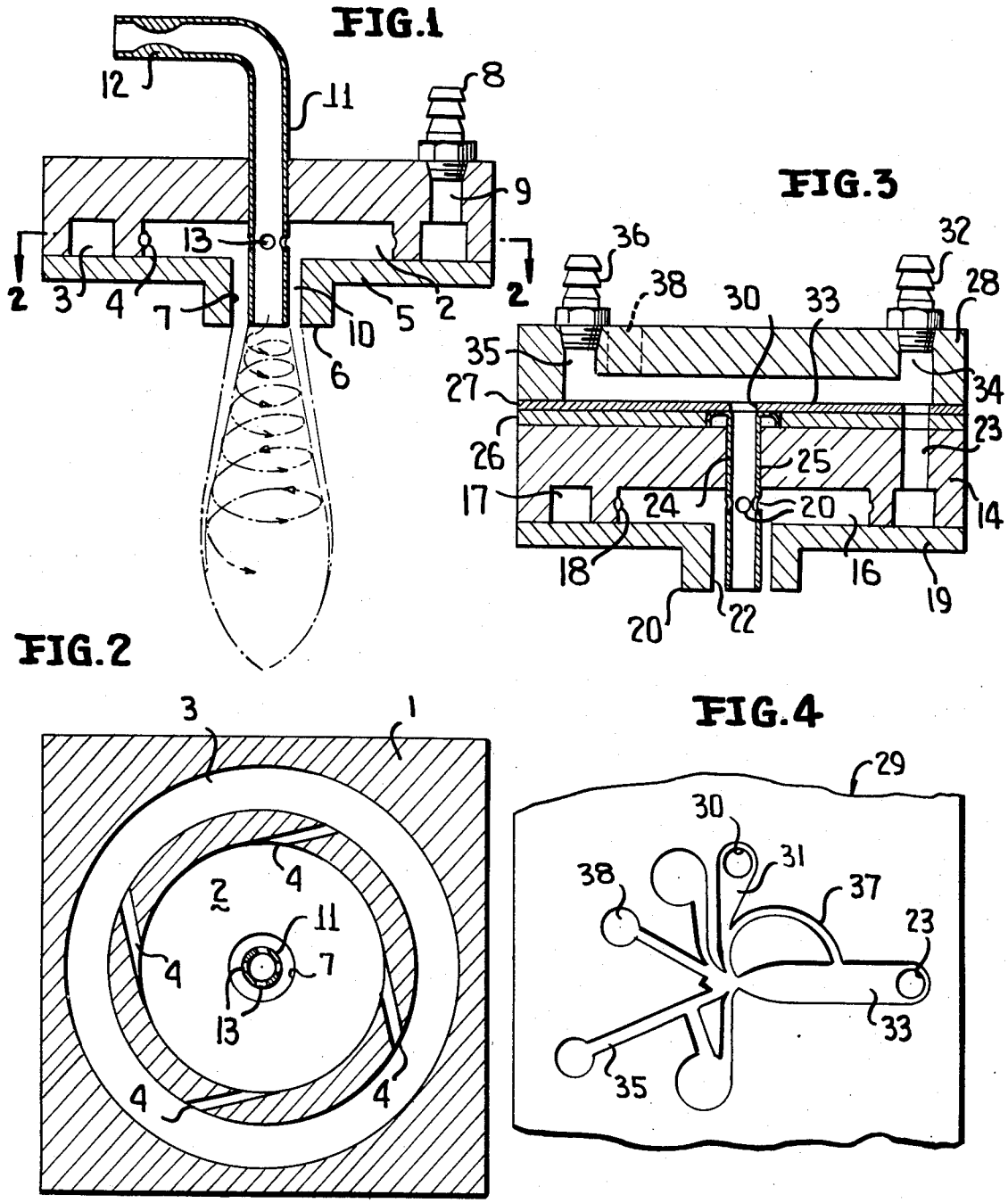

INVENTOR
ANTHONY KOPERA

Hurvitz & Rose

ATTORNEYS

PATENTED JAN 23 1973 3,712,318

INVENTOR
ANTHONY KOPERA

By Hurvitz & Rose

ATTORNEYS

VORTEX PROXIMITY SENSOR WITH INCREASED SENSING RANGE

CROSS REFERENCE

This application is a continuation-in-part of my prior application Ser. No. 835,643, filed June 23, 1969, entitled "Improved Vortex Proximity Sensor", and now abandoned.

BACKGROUND OF THE INVENTION

The present invention relates to fluidic proximity sensing devices and more particularly to such devices employing vortical fluid flow as the sensing medium. Specifically, the present invention is an improved version of the vortex proximity sensor described in U. S. Patent application Ser. No. 625,183, filed Mar. 22, 1967 by D. R. Jones, and entitled "Vortex Proximity Sensor," now U. S. Pat. No. 3,481,180.

The vortex proximity sensor of the above-referenced patent comprises a vortex chamber adapted to receive tangential input flow and having an axially located egress orifice of circular cross-section. A small diameter sensing tube extends axially into the chamber with its sensing end disposed in the region of the chamber egress orifice. A vortical sheet of fluid flow exists from the egress orifice and, when unimpeded, produces a low or negative (i.e., less than ambient) pressure in the sensing tube. When the vortical sheet is impeded, as by a sensed proximate object, a static pressure rise is experienced in the sensing tube. By monitoring the static pressure in the sensing tube one can detect objects proximate the chamber egress orifice and at distances therefrom which are up to eight times greater than distances sensed with axial flow type proximity sensors.

It has been found that the vortical flow issued from the egress orifice diverges, relative to the vortex chamber axis, for a specified distance downstream of the egress orifice and then converges toward a downstream point and collapses. It is possible to sense or detect only those objects which come closer to the chamber egress orifice than the convergence point of the vortex sheet. The location of this convergence point has been found to depend upon the pressure of fluid supplied to the vortex chamber and upon the diameter of the egress orifice. Increasing either the supply pressure or the egress orifice diameter serves to extend the vortical sheet; however this is done at the cost of increased power consumption. I have found that the reason for convergence of the vortex sheet is the existence of a negative static pressure interiorly of the sheet which tends to draw the fluid back toward the axis. In effect the rotating flow entrains or sucks fluid from the sheet interior until the interior pressure becomes sufficiently negative to collapse the sheet. I have found that increasing the static pressure interiorly of the sheet moves the convergence point of the sheet, for any given supply pressure, downstream relative to the vortex chamber egress orifice, and consequently the detection or sensing range of the device is substantially increased. In addition, by extending the sensor tube fully into the egress orifice, thereby providing an annular egress, a significant decrease in power consumption is effected without any loss in sensing range.

It is therefore an object of the present invention to provide a vortex proximity sensor having an extended sensing range as compared with prior art sensors.

It is another object of the present invention to extend the distance between the egress orifice of a vortex chamber and the point of convergence of a vortex sheet of fluid issued from that egress orifice.

It is still another object of the present invention to provide a means for increasing the static pressure interiorly of a sheet of vortical fluid flow issuing from a vortex chamber and thereby increase the axial distance of travel of said fluid flow.

It is still another object of the present invention to provide a vortex proximity sensor with an annular egress orifice to minimize power consumption by the sensor without sacrificing sensing range.

I have also found that, within the sensing range of a sensor which has been improved by increasing the pressure interiorly of the vortex sheet, the pressure in the sensing tube varies proportionally with object proximity to the chamber egress orifice. Unfortunately, the proportional pressure in the sensing tube is too low to be utilized by most proportional — type utilization equipment.

Therefore, it is another object of the present invention to render a vortex proximity sensor useful in providing a proportional indication of object proximity.

It is still another object of the present invention to utilize my improved vortex proximity sensor in combination with a sensitive pressure amplifying arrangement to thereby render the sensor useful in providing a proportional indication of object proximity.

SUMMARY OF THE INVENTION

In accordance with the principles of the present invention fluid from the vortex chamber is bled to the interior of the sensing tube and vortex sheet to raise the static pressure therein, thereby moving the convergence point of the vortex sheet downstream. Moreover the sensing tube is rendered co-extensive with the egress orifice to provide an annular egress in which the diameter can be enlarged to extend the range of the sensor without significant power consumption increase.

In addition, the sensing pressure in the sensing tube is employed to displace a diaphragm in opposition to flow issued from a supply nozzle. The position of the diaphragm relative to the nozzle changes the pressure upstream of the nozzle, the latter pressure being sensed as a proportional function of object proximity. The result is a vortex proximity sensor with improved sensing range and a proportional measurement capability.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a side view in section of one embodiment of the present invention;

FIG. 2 is a top view in section taken along line 2—2 in FIG. 1;

FIG. 3 is a side view in section of a second embodiment of the present invention;

FIG. 4 is a top view in section of the embodiment illustrated in FIG. 3;

DESCRIPTION OF THE PREFERRED EMBODIMENTS

Figure 5:
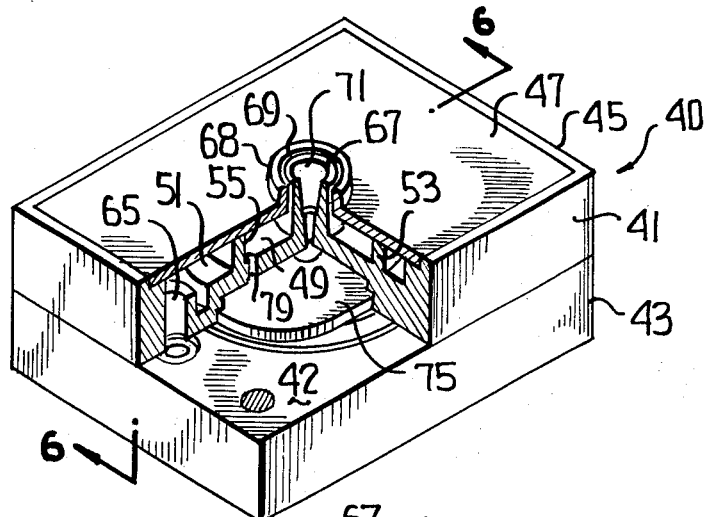
FIG. 5 is a view in perspective and partial section of another embodiment of the present invention.
Figure 6:
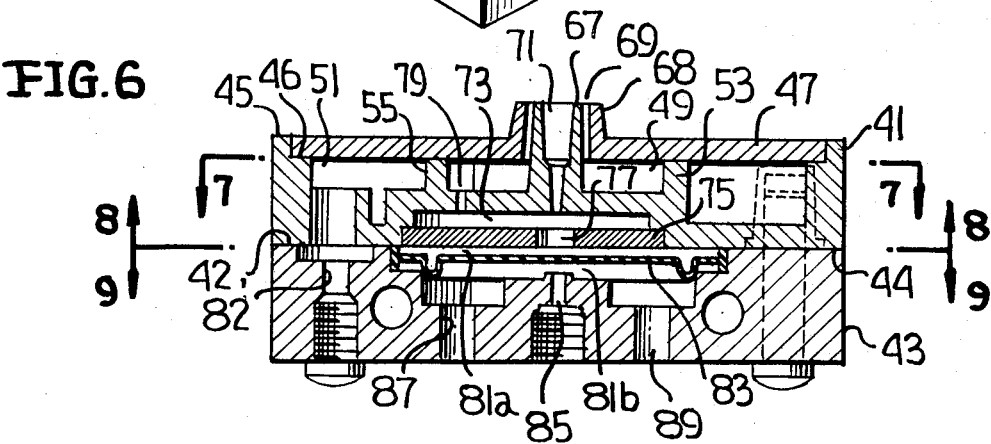
FIG. 6 is a sectional view taken along lines 6—6 of FIG. 5.
Figure 7:
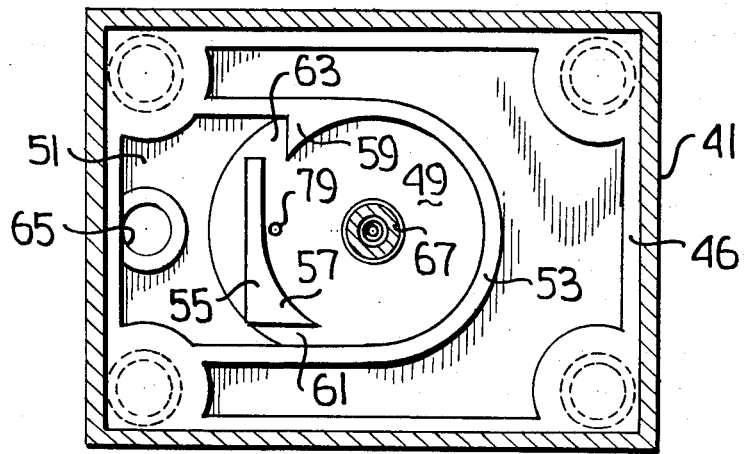
FIG. 7 is a sectional view taken along lines 7—7 of FIG. 6.
Figure 8:
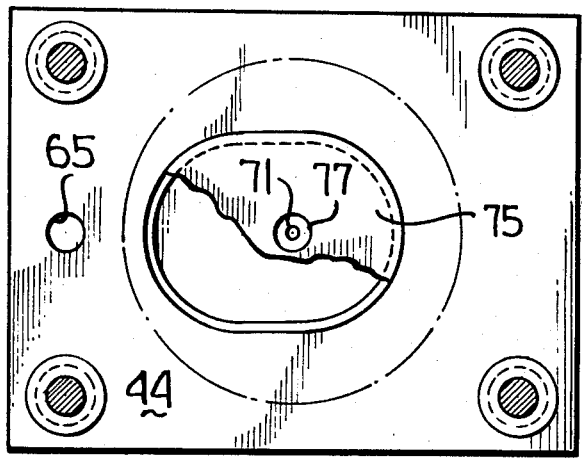
FIG. 8 is a sectional view taken along lines 8—8 of FIG. 6.
Figure 9:
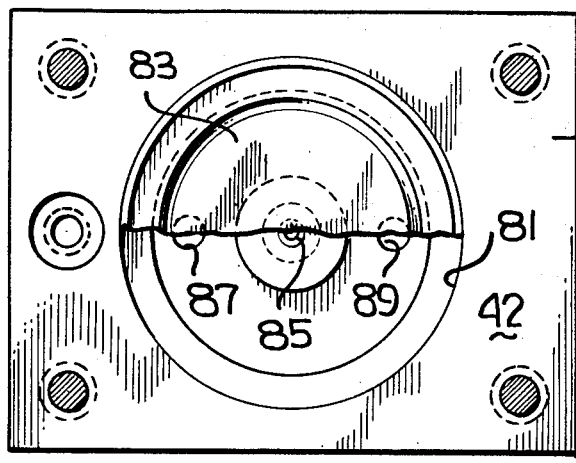
FIG. 9 is a sectional view taken along lines 9—9 in FIG. 6.

Referring specifically to FIGS. 1 and 2 of the accompanying drawings there is illustrated a block of material 1 having formed therein a flat cylindrical recess or chamber 2 constituting a vortex chamber of the type generally described in U. S. Pat. No. 3,272,213. A flat annular recess 3 is formed in block 1 concentrically about vortex chamber 2. Four equally spaced passages 4 communicate between annular recess 3 and chamber 2 and are oriented to respond to pressurized fluid in annular recess 3 by issuing respective fluid streams tangentially into chamber 2.

Block 1 is covered by a plate 5 which forms a flat, fluid-tight cover for annular recess 3 and a portion of vortex chamber 2. Plate 5 has a hollow cylindrical projection 6 which extends away from vortex chamber 2 and provides an axial egress passage 7 for chamber 2. The term axial, as used herein, refers to the axis of symmetry, extending perpendicularly through the center of the circular cross section of chamber 2. Pressurized fluid applied to annular recess 3, as by means of Christmas-tree fitting 8 and fluid passage 9 extending through block 1, issues tangentially into chamber 2. Flow in chamber 2 assumes a vortex pattern and egresses through passage 7 in a helical (combined vortical and axial) flow pattern. This helical flow pattern is unconfined after egressing from passage 7 and begins to diverge into a generally vortical or rotating sheet of flow in a downstream direction.

A sensing tube 11 extends along the axis of chamber 2 through a suitable axial opening in block 1 and through chamber 2 into concentric relation within egress passage 7. The presence of sensing tube 11 within passage 7 defines an annular egress opening 10 for chamber 2. The sensing end of tube 11, that is the end extending into passage 7, is illustrated, by way of example only, as terminating in precise registry with the termination of projection 6. The sensing end of tube 11 may be otherwise terminated, if desired, in accordance with considerations to be subsequently described.

The end of tube 11 opposite the sensing end is provided with a flow restriction 12. In addition, four coplanar apertures 13 are defined through the wall of tube 11 to provide fluid communication between vortex chamber 2 and the interior of tube 11.

In the device described in the above-referenced Jones U.S. Pat. No. 3,272,213, the vortical sheet of fluid, when unimpeded, creates a negative static pressure interiorly of the sheet which is reflected in the sensing tube. When the vortical sheet is impeded, the static pressure interiorly of the sheet, and hence in the sensing tube, increases to some positive pressure level sufficient to provide an indication of the impediment to flow. As described above, the negative static pressure provided during unimpeded flow causes convergence of the sheet and limits the range of object detection.

In the present invention, when the vortical sheet of fluid is unimpeded, the low static pressure interiorly of the sheet draws fluid from vortex chamber 2 through apertures 13 into tube 11 and in turn into the sheet interior. The fluid thus bled from the vortex chamber 2 to the sheet interior raises the static pressure interiorly of the sheet and tends to move the point at which the sheet converges substantially downstream.

There are a number of structural parameters which must be considered to achieve proper operation of the proximity detector of FIGS. 1 and 2. For one thing, it is important that the bleed flow through apertures 13 be sufficient to increase static pressure in the vortical sheet to a level which prevents premature collapse of the sheet as described above. However, too great a bleed flow rate through apertures 13 tends to increase the static pressure interiorly of the sheet to a level at which the sheet does not hold together but instead "explodes" at egress opening 10 to form an indefinable irregular flow pattern having little utility for proximity detection purposes. For another thing, the vortical flow rate of fluid egressing from opening 10 must be sufficient to maintain a defined vortical or rotating sheet of flow. The structural parameters which inter-relate to affect the bleed and vortical flow rates are: (1) the total cross-sectional area of fluid passages 4, designated hereinafter as $A_I$; (2) the cross-sectional area of opening 10, designated hereinafter as $A_o$; and (3) the total cross-sectional area of apertures 13, designated hereinafter as $A_B$. $A_I$, for a given pressure in passage 9, determines the fluid flow rate into chamber 2 and thereby partially determines the radial pressure gradient across chamber 2. $A_o$ determines the outflow rate from chamber 2 and therefore, along with $A_I$, determines the radial pressure gradient across chamber 2. If an insufficient radial pressure gradient is provided across chamber 2, the outflow from opening 10 is not a defined vortical or rotating sheet but rather some erratic flow pattern.

$A_B$ partially determines the bleed flow rate into tube 11. Also determinative of the bleed flow rate for a given pressure in passage 9 is $A_I$, since the bleed flow depends upon the inflow to chamber 2. If $A_B$ is too large relative to a given $A_I$, too much bleed flow exists and the outflow through opening 10 tends to "explode" as described above. If $A_I$ is too small, not enough bleed flow exists to accomplish the primary aim of the present invention, namely to increase the pressure interiorly of the vortex sheet so as to move the point at which the stream converges downstream.

In optimizing the above-described parameters I have found that best results are obtained when the static pressure at restriction 12, in the absence of a detected object, is ambient and the pressure at the sensing end of tube 11 is just slightly below ambient. A particular configuration of the proximity detector of FIGS. 1 and 2 in which such results are achieved had the following dimensions: the four passages 4 had cross sections of 0.050 × 0.050 inch for a total value for $A_I$ of 0.01 sq. in.; the area of opening 10, $A_o$, was 0.0041 sq. in.; and the total area $A_B$ of the bleed aperatures 13 was 0.0052 sq. in. It is interesting to note that the total bleed area $A_B$ and the output area $A_o$ sum to approximately the vortex chamber input area $A_I$ in this configuration. Consequently the bleed flow and vortical outflow from chamber 2 are very nearly equal.

I have found the ratios ($A_I/A_o$) and ($A_I/B$) quite useful for purposes of design criteria. More particularly, satisfactory results are obtained when ($A_I/A_o$) $\geq$ 2.4, and when ($A_I/A_B$) $\geq$ 1.9.

Referring now to FIGS. 3 and 4 of the accompanying drawings there is illustrated a second embodiment of the present invention. The apparatus again comprises a suitable body 14 having a cylindrical recess 16 formed therein to provide a vortex chamber. A flat annular recess 17 is also formed in body 14 concentrically about chamber 16. Four equally spaced passages 18 communicate between annular recess 17 and chamber 16 and are oriented to respond to pressurized fluid in recess 17 by issuing respective fluid streams tangentially into chamber 16.

Block 14 is covered by plate 19 which forms a flat fluid-tight cover for annular recess 17 as well as a portion of chamber 16. Plate 19 has a hollow cylindrical projection 21 which extends away from vortex chamber 16 and provides an axial egress passage 22 for chamber 16. Pressurized fluid applied to annular recess 17, as by means of fluid passage 23 extending through body 14, issues tangentially into vortex chamber 16. Flow in chamber 16 assumes a vortical flow pattern and egresses through passage 22 in a helical pattern. As described above, the outflowing fluid is unconfined after leaving passage 22 and begins to diverge into a generally vortical sheet of flow away from projection 21.

A cylindrical sensing tube 24 extends along the axis of chamber 16 and through the chamber with its sensing end terminating in precise registry with the extremity of projection 21. Tube 24 is made of copper or some other suitably resilient material so that the tube may be press-fit into an appropriate suitable hole 25 extending through block 14 axially of chamber 16. The end of tube 24 opposite its sensing end flares out in a lip which engages the outer surface of block 14 about the rim of hole 25. Four bleed apertures 20 are defined through tube 24 to provide fluid communication between chamber 16 and the tube interior.

A rubber gasket 26 and cover plate 27 overlie the outer surface of block 14 through which tube 24 extends. Both gasket 26 and plate 27 have respective holes defined therein and disposed in alignment with passage 23 in block 14. In addition, gasket 26, which when compressed between cover plate 27 and block 14 has a thickness approximately equal to the height by which the lip of tube 24 projects beyond block 14, has a further hole of sufficient diameter to accommodate the lip of tube 24. A further hole 30 in cover plate 27 is in alignment with the hollow interior of tube 24.

Secured to cover plate 27 on the side opposite gasket 26 is a further block 28 which has a fluidic OR/NOR gate 29 formed in the surface abutting cover plate 26. Fluidic OR/NOR gate 29 is conventional and by way of example may be configured similarly to the OR/NOR gate illustrated in the aforementioned Jones U.S. Pat. No. 3,272,213. A control passage 31 of gate 29 is aligned with hole 30 in plate 27 to permit fluid communication between sensor tube 24 and control passage 31. A source of pressurized fluid is applied through a fitting 32 to a passage 34 extending through block 28 into communication with the power nozzle 33 of gate 29. Passage 34 is aligned with the aforesaid aligned holes in gasket 26 and plate 27 to permit application of pressurized fluid to passage 23 in block 14. Another fitting 36 is provided for the OR output passage 35 of gate 29. A bias passage 37 may communicate between power nozzle 33 and control nozzle 31, applying a quiescent bias pressure to the control nozzle so that the static pressure in tube 24 at which the power stream of gate 29 switches may be lower than it would be without the bias passage. The lower switching pressure increases the switching sensitivity of gate 29 in response to object detection. Gate 29 is also provided with a NOR output passage 38 which vents to ambient pressure.

In operation, in the absence of a detected object, a rotating sheet of fluid issues from passage 22, the interior of the sheet being provided with bleed fluid via apertures 20 in order to extend the axial length of the sheet. The bleed fluid maintains substantially ambient pressure at control port 31 of gate 29, keeping the latter in its NOR mode. When an object is detected, the static pressure interiorly of the rotating sheet increases sharply causing gate 29 to switch to its OR mode wherein it provides an output signal at OR output passage 35.

Referring now to FIGS. 5 through 9, inclusive, another embodiment 40 of the present invention is illustrated as comprising a pair of abutting rectangular blocks 41, 43 of plastic, metal or similar material joined by screws or the like in fluid-tight relation. Blocks 41 abut at respective surfaces 44, 42. A vortex proximity sensor is formed in block 41, and operates, in principal, similarly to the sensors of FIGS. 1 and 3. Block 41 includes a surface 45, most remote from block 43, which is recessed to form a peripheral shoulder 46 arranged to support a rectangular cover plate 47. Surface 45 is further recessed interiorly of shoulder 46 to form a vortex chamber 49 and fluid supply region 51 sealed by cover plate 47. More specifically, chamber 49 and region 51 are defined interiorly of a generally U-shaped wall 53 whose upper extremity is co-planar with shoulder 46 and whose legs extend from the shoulder. A further wall 55 separates chamber 49 from region 51 and also has its upper extremity co-extensive with shoulder 46. A cusped portion 57 of wall 55 co-operates with a cusped extension 54 of wall 53 to provide a circular configuration for vortex chamber 49, the base of the U-shaped wall comprising one-half of the chamber periphery.

The space between cusp 57 and wall 53 defines a first tangential inlet passage 61 to chamber 49 from region 51. A second inlet tangential inlet passage to chamber 49 from region 51 is provided between cusp 59 and wall 55. Passages 61 and 63 introduce pressurized fluid into chamber 49 in the same rotational direction, i.e., counterclockwise as viewed in FIG. 7. Pressurized fluid is supplied to region 51 via a channel 65 extending through block 41 into communication with a supply nozzle 82 formed in block 43.

A projection 67, located centrally of vortex chamber 49, extends through the chamber and exteriorly of block 41 into a cylindrical projection 68 defined through cover plate 47. The spacing between projections 67 and 68 defines an annular egress opening 69 for the vortex chamber 49. Projection 67 is tapered, having a circular cross-section with a diameter which decreases with distance from the base of the vortex chamber.

The interior of projection 67 is hollow, defining a nozzle 71 which is tapered oppositely to the taper of the projection exterior. Nozzle 71 comprises the sensor passage for unit 40, the pressure therein being a measure of the pressure interiorly of the vortex sheet issued from between projection 67 and aperture 69.

Nozzle 71 communicates with a further chamber 73, formed as an oval recess in surface 44 of block 41 and sealed by an oval cover plate 75 which lies flush with surface 44. A circular aperture 77 is defined through cover plate 75 in alignment with nozzle 71. Aperture 77 is preferably of larger diameter than nozzle 71. Chamber 73 communicates with vortex chamber 49 by means of a bleed channel 79 extending between these chambers through block 41. Bleed channel 79 serves the function of supplying fluid to chamber 73, nozzle 71 and the interior of the vortical sensing sheet to prevent premature collapse of the sheet. In this regard, channel 79 serves the same function as apertures 13 in FIG. 1 and apertures 20 in FIG. 3.

Surface 42 of block 43 is recessed to form a sensing chamber 81. The latter is sealed by surface 44 of block 41 and cover plate 75, and communicates with chamber 73 and nozzle 71 via aperture 77. A thin flexible diaphragm 83 of membrane divider chamber 81 into two fluid isolated sections 81a and 81b. Section 81a is pressurized in accordance with the proximity of an object to egress opening 69; that is, section 81a is at the same pressure as the interior of the vortical sensing sheet. Section 81b is pressurized by supply fluid applied to a nozzle 85 formed in block 43 and communicating with a fluid fitting 87. Chamber section 81b is also vented to ambient by means of a pair of bleed channels 87, 89.

Diaphragm 83 and nozzle 85 comprise a flapper-valve arrangement wherein the diaphragm is displaced from the nozzle as a function of the pressure in chamber 73 and nozzle 71. For relatively low pressures in nozzle 71 (corresponding to no object impinged upon by the vortical sensing sheet), diaphragm 83 is relatively far from nozzle 85 and little back pressure is experienced in that nozzle. When an object is sensed by the vortical sheet the pressure in nozzle 71 increases and displaces the diaphragm closer to nozzle 85. The result is a significant back pressure in nozzle 85 which is readily measurable in the manner described below with reference to FIGS. 10 and 11.

Of significant importance is the fact that the pressure interiorly of the vortex sheet, and hence in nozzle 71, varies proportionally with the distance between egress opening 69 and an object in the sensing range of unit 40. The sensed pressure, while of itself being too low to be directly useful, is greatly amplified in the form of the back pressure in nozzle 85. Thus by employing the flapper valve arrangement, proportional proximity sensing is made feasible.

Figure 10:
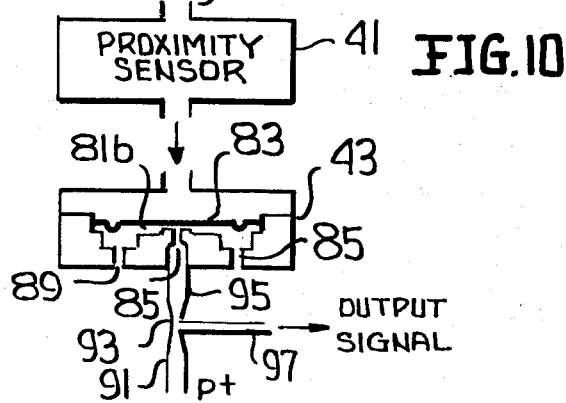
FIG. 10 is a schematic diagram of the embodiment of FIG. 5 employed in combination with an amplifier arrangement to permit proportional object proximity detection.

One practical approach to sensing the back pressure produced in nozzle 85 is illustrated schematically in FIG. 10. Specifically, pressurized fluid, $P+$, is applied to a tube 91 having a venturi section 93 and a downstream section 95 which feeds nozzle 85. An output passage 97 communicates perpendicularly with venturi section 93 to sense the pressure in that section.

When no object is in the sensing range of the unit, diaphragm 83 is relatively far from nozzle 85 and fluid received from tube section 95 is bled to ambient via passages 87, 89. Under such circumstances the static pressure in venturi section 93, as sensed by passage 97, is relatively low.

When an object enters the sensing range of the unit, diaphragm 83 is displaced toward nozzle 85, effectively restricting outflow therefrom into chamber 81b. This produces a back pressure in nozzle 85 and an increase in static pressure at venturi section 93 as sensed via passage 97. As stated above, this back pressure is proportional to the proximity of the object to egress opening 69.

Figure 11:
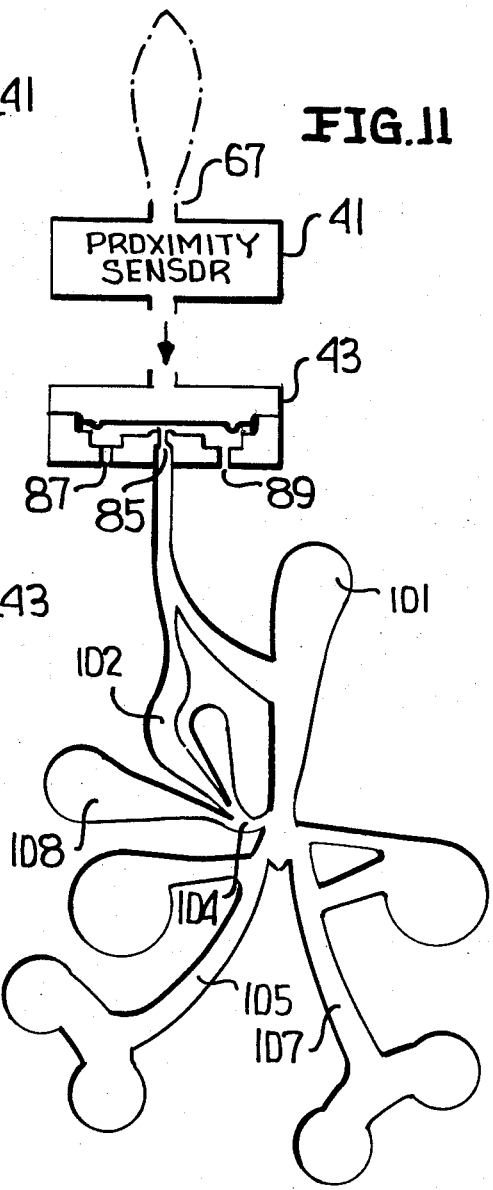
FIG. 11 is a schematic diagram of an alternative arrangement to the circuit of FIG. 10.

A modification of the circuit of FIG. 10 is illustrated in FIG. 11 wherein the amplified output pressure is employed to control a fluidic OR/NOR gate 100. Specifically, gate 100 is substantially similar in operation to gate 29 of FIG. 4 but instead derives its control signal from the back pressure produced in nozzle 85. Gate 100 includes a power nozzle 101 which responds to pressurized fluid applied thereto for issuing a power stream into an interaction region 106. The sidewalls of region 106 are arranged to cause the stream to issue into NOR outlet passage 105 in the absence of a control signal applied to gate 100. In the presence of a control signal the power stream is switched to OR outlet passage 107.

Fluid passage 103 extends from power nozzle 101 to nozzle 85 in block 43 and supplies pressurized fluid to nozzle 85. Back pressure in nozzle 85 and passage 83 is sensed by control passage 102 which feeds control port 104 for gate 100. If the back pressure in nozzle 85 is sufficiently high, the power stream in gate 100 is caused to switch to OR passage 107, indicating that a detected object is closer to projection 67 than a predetermined minimum spacing. This predetermined spacing can be adjusted by applying a bias signal to a further control passage 108 which also feeds nozzle 104. Depending upon the bias pressure applied to passage 108, the power stream in gate 100 is caused to switch at different back pressure levels in passage 103.

It should be apparent that various changes can be made in the parameters of the system without departing from the spirit of the invention. Thus, sensitivity of the device to changes in supply pressure may be somewhat reduced by making the vortex chamber larger at least in depth if not in diameter. This provides a larger storage of fluid and thus a greater inertia which inherently is less sensitive to small fluctuations in the supply pressure. Further, in a particular type of operation, proximity as such is not the only parameter than can be measured. The device can be used to measure dimensions of a body conveyed below projections 6, 21 and 67 and perpendicular, for example, to the axis of the vortex chambers. When the object is directly under the sensing unit and its height above a fixed bed is insufficient to produce a large rise in pressure in the sensing tube, an output signal is not derived from the tube 11 of FIG. 1 or fitting 36 of FIG. 3. On the other hand, if the device is of the proper size or conversely is oversized, a sharp static pressure increase occurs in tube 11 and the OR/NOR gate is triggered due to pressure rise at the control passage 31. If a device is to have a range of sizes between two limits, then by passing the object to be sensed under a first and then a second such proximity detector, it is possible to determine whether the device lies above or below a specific range or lies within a specific range of sizes or heights.

It is also possible, of course, to employ a proportional fluidic amplifier, such as the type disclosed in U. S. Pat. No. 3,275,013, instead of the monostable gate 100 of FIG. 11. In such case, an amplified proportional output signal would be provided.

While I have described and illustrated specific embodiments of my invention, it will be clear that variations of the details of construction which are specifically illustrated and described may be resorted to without departing from the true spirit and scope of the invention as defined in the appended claims.

I claim:

1. A fluidic proximity sensor comprising:
    means for issuing fluid from a predetermined location in a rotating flow pattern;
    means for supplying fluid interiorly of said rotating flow pattern to increase the static pressure therein; and
    means responsive to interruption of said flow pattern providing a fluid signal indication.

2. The fluidic proximity sensor according to claim 1 wherein said means for issuing comprises a vortex chamber having an egress passage for issuing said fluid in said rotating flow pattern and wherein said means for providing a fluid signal indication comprises a sensor passage extending into said egress passage and disposed for sensing static pressure in the vicinity of said egress passage.

3. The fluidic sensor according to claim 2 wherein said egress passage and said sensor passage are co-extensive to define an annular egress from said proximity sensor for said rotating flow pattern.

4. The fluidic proximity sensor according to claim 2 wherein said means for supplying fluid comprises fluid passage means for conducting fluid from said vortex chamber into said sensor passage.

5. The proximity sensor according to claim 4 further comprising switching means for assuming a first state in response to the static pressure in said sensor passage being below a predetermined level and for assuming a second state in response to the static pressure in said sensor passage being equal to or greater than said predetermined level.

6. The proximity sensor according to claim 4 wherein said fluid signal indication is a fluid pressure proportional to the distance from said point of interruption to said predetermined location.

7. The proximity sensor according to claim 4 further comprising:
    a chamber;
    a diaphragm dividing said chamber into two pressure isolated compartments;
    means for pressurizing one of said compartments with fluid in said sensor passage; and
    a nozzle for issuing pressurized fluid into the other of said compartments and located such that flow from said nozzle is increasingly restricted by said diaphragm with increasing pressure in said one compartment.

8. The proximity sensor according to claim 7 further comprising:
    a fluid passage connected to supply pressurized fluid to said nozzle; and
    means for sensing pressure in said fluid passage.

9. The proximity detector according to claim 8 wherein said means for sensing comprises an active fluidic element having a control passage connected to said fluid passage.

10. The proximity sensor according to claim 8 wherein said fluid passage includes a venturi section and wherein said means for sensing senses pressure at said venturi section.

11. A fluidic proximity sensor comprising:
    a vortex chamber of substantially circular cross section having an axis of symmetry disposed normal to said cross section, an egress orifice disposed symmetrically about said axis of symmetry, means for supplying fluid to said chamber, and means for rotating said fluid about said axis of symmetry such that fluid egresses from said egress orifice in a predetermined unconstrained hollow flow pattern;
    means for providing a fluid pressure signal above a specified pressure level in response to interruption of said predetermined flow pattern within a specified distance from said egress orifice; and
    means for extending said hollow flow pattern beyond said specified distance by supplying fluid interiorly of said hollow flow pattern.

12. The fluidic proximity sensor according to claim 11 wherein said means for providing a fluid pressure signal comprises a sensor passage disposed for sensing static pressure at a location along said axis of symmetry, and wherein said means for extending comprises fluid bleed passage means for supplying fluid to said sensor passage from said vortex chamber.

13. The fluidic proximity sensor according to claim 12 wherein said fluid sensor passage comprises a sensor tube coaxial with and extending through said vortex chamber, and wherein said fluid bleed passage means comprises at least one aperture defined through said sensor tube at a portion of said sensor tube which is disposed within said vortex chamber.

14. The fluidic proximity sensor according to claim 13 wherein said means for supplying fluid to said chamber comprises a plurality of fluid input passages communicating tangentially with the periphery of said chamber for issuing pressurized fluid into said chamber, wherein said fluid bleed passage means comprises a plurality of apertures defined through said sensor tube, and wherein the ratio of the total cross-sectional area of said fluid input passages to the total cross-sectional area of said apertures is at least 1.9.

15. The fluidic proximity sensor according to claim 14 wherein the ratio of the total cross-sectional area of said fluid input passages to the cross-sectional area of said egress orifice is at least 2.4.

16. The fluidic proximity sensor according to claim 12 further comprising:
   a further chamber in fluid communication with said sensor passage;
   a diaphragm for dividing said further chamber into two compartments wherein said sensor passage communicates with one compartment;
   a nozzle for issuing fluid into the other of said compartments, the downstream end of said nozzle lying proximate said diaphragm such that flow from said nozzle is increasingly restricted by said diaphragm with increasing pressure in said one compartment, and
   means for venting fluid from said other compartment.

17. The fluidic proximity sensor according to claim 16 wherein said fluid bleed passage includes a fluid passage communicating between said vortex chamber and said one compartment.

18. In a fluid system, a vortex chamber having a circular cross-sectional configuration, an axis of symmetry normal to said circular cross-sectional configuration, means for supplying pressurized fluid to said chamber at the chamber periphery, means for inducing vortical flow of fluid in said chamber, a hollow projection extending through said chamber along said axis of symmetry, and a fluid passage communicating between said vortex chamber and the interior of said hollow projection.

19. The method of extending the sensing range of a vortex proximity sensor of the type which issues a rotating sheet of fluid to impinge against a sensed object, said method comprising the step of supplying pressurized fluid to the interior of said rotating sheet.

20. In a fluid system, a vortex chamber having a circular cross-sectional configuration, an axis of symmetry normal to said circular cross-sectional configuration, means for supplying pressurized fluid to said chamber at the chamber periphery, an egress passage extending along said axis, means for inducing vortical flow of fluid in said chamber, and a sensing passage extending through said chamber along said axis of symmetry interiorly of said egress passage to define an annular egress opening.

* * * * *